Nov. 6, 1962

S. HAMILTON 3,062,003

VARIABLE AREA EXHAUST NOZZLE

Filed April 6, 1959

INVENTOR
STUART HAMILTON

BY *Vernon F. Hauschild*
ATTORNEY

Nov. 6, 1962 S. HAMILTON 3,062,003
VARIABLE AREA EXHAUST NOZZLE
Filed April 6, 1959 2 Sheets-Sheet 2

INVENTOR
STUART HAMILTON
BY Vernon F. Hauschild
ATTORNEY

United States Patent Office 3,062,003
Patented Nov. 6, 1962

3,062,003
VARIABLE AREA EXHAUST NOZZLE
Stuart Hamilton, Bloomfield, Conn., assignor to United Aircraft Corporation, East Hartford, Conn., a corporation of Delaware
Filed Apr. 6, 1959, Ser. No. 804,541
2 Claims. (Cl. 60—35.6)

This invention relates to jet propulsion type aircraft engines and more particularly to the exhaust outlets used in connection therewith.

It is an object of this invention to teach an exhaust outlet having an exhaust nozzle, blow-in doors and a variable area secondary nozzle.

It is a further object of this invention to teach an exhaust outlet having good subsonic and supersonic flow characteristics with minimum base drag.

Other objects and advantages will be apparent from the specification and claims and from the accompanying drawings which illustrate an embodiment of the invention.

Figure 1:
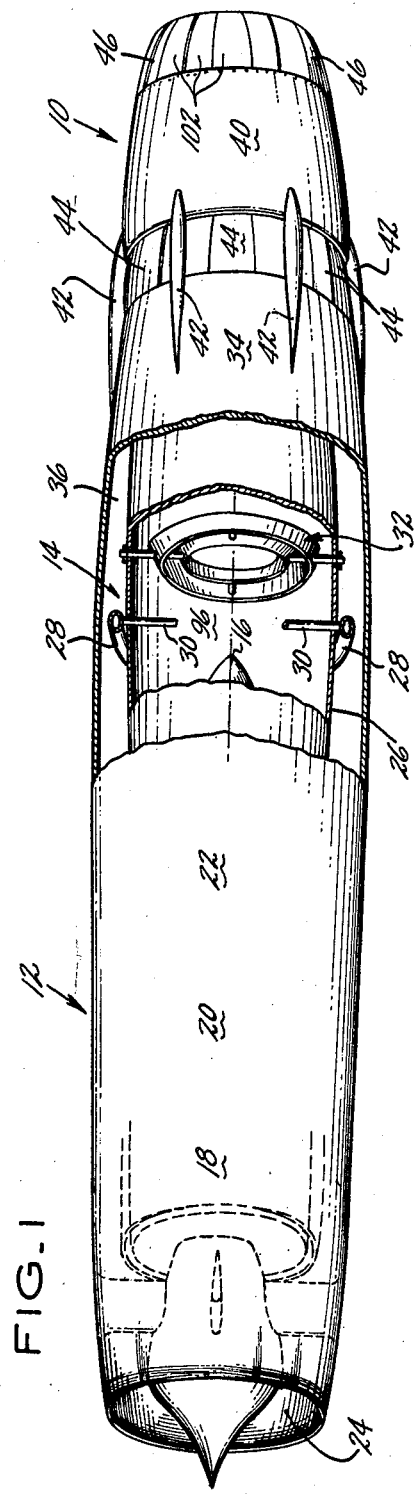
FIG. 1 is an external perspective view, partially broken away, to show my exhaust outlet on a jet type aircraft engine.

FIG. 1 shows my exhaust outlet 10 used on a conventional high speed aircraft jet type engine 12 having an afterburner 14, all of which are generally circular cross section and concentric about axis or centerline 16. Aircraft engine 12 comprises compressor section 18, burner section 20 and turbine section 22 which connects to afterburner 14. Air enters engine 12 through air intake 24, is compressed as it passes through compressor section 18, is heated in passing through burner section 20 and has energy extracted therefrom to drive compressor 18 while passing through turbine section 22. The engine gases then pass through afterburner 14 to be reheated therein before discharge to atmosphere through exhaust outlet 10. Engine 12 is of conventional design and may be of the type described more fully in U.S. Patent No. 2,747,367. Afterburner 14 is of conventional construction and comprises primary duct 26 which defines a primary gas passage 96 and receives the exhaust gases from engine 12. Fuel manifold 28 surrounds primary duct 26 and provides atomized fuel to the interior thereof through fuel spray bars 30. Flameholder unit 32 is positioned downstream of spray bars 30 and performs the function of establishing a stagnant region downstream thereof in which the fuel-air mixture created by the atomized fuel from spray bars 30 and the engine exhaust gases passing through primary duct 26 may be ignited by any convenient means such as a spark plug or explosive charge (not shown) and burned in a combustion zone downstream of flameholder unit 32. Afterburner 14 is of a conventional type and may be of the type taught in U.S. Patent No. 2,714,285.

The portions of exhaust outlet 10 shown in FIG. 1 are secondary duct 34 which envelops primary duct 26 and is concentric thereabout to define secondary air passage 36 therebetween, which secondary air passage 36 receives ram air from inlet 24, or may receive air from a separate inlet (not shown). Fixed member 40 is positioned axially downstream of secondary duct 34 and supported therefrom by a plurality of axially extending and circumferentially spaced struts 42. A plurality of sealably overlapping and circumferentially positioned pivotal blow-in doors 44 are positioned between secondary duct 34 and fixed member 40 in a fashion to be described in greater particularity hereinafter. Variable area secondary nozzle 46 is pivotally attached to fixed member 40 to provide a variable area continuation thereof and comprises a plurality of sealably overlapping and circumferentially spaced flaps 102 pivotally attached thereto in a fashion to be described in greater particularity hereinafter.

Figure 2:
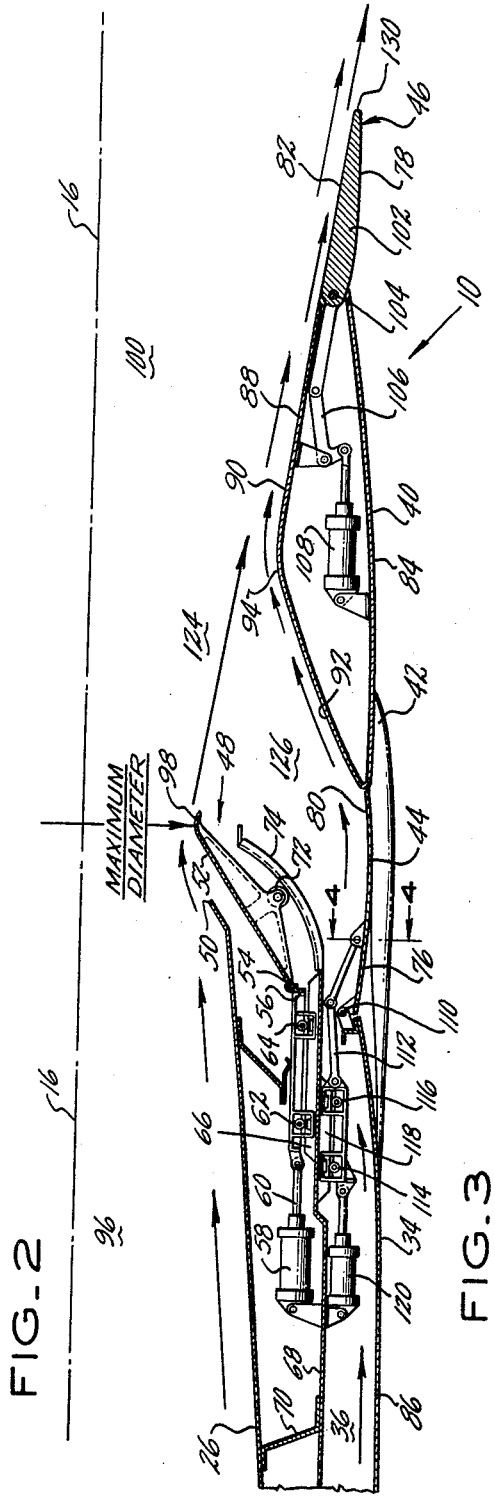
FIG. 2 is a cross-sectional showing of my exhaust outlet in its supersonic position.

Exhaust outlet 10 is shown in its supersonic or high speed position in FIG. 2. Exhaust outlet 10 is of generally circular cross section as previously stated and concentric about axis 16 so that it should be borne in mind that a full cross-sectional view of exhaust outlet 10 would be similar and symmetric on the opposite side of axis 16 to that shown in FIGS. 2 and 3, so that FIGS. 2 and 3 actually show one-half of the exhaust outlet 10. In the supersonic or high speed condition, shown in FIG. 2, variable area primary exhaust nozzle 48, which may be of the type shown in U.S. Patent No. 2,815,643 or No. 2,836,034, defines a variable area primary nozzle at the downstream end 50 of primary duct 26, is shown to be in or near its maximum diameter position. Variable area exhaust nozzle 48 comprises a plurality of sealably overlapping an circumferentially positioned pivotal flaps 52. Each flap 52 is pivotally connected at pivot point 54 to actuating ring 56, which actuating ring is caused to move axially by the action of hydraulically actuated cylinder-piston unit 58, the piston of which is connected to ring 56 by linkage 60. Linkages 60 are supportedly guided by roller members 62 and 64 coacting with track 66. Track 66 is supported in position by support shroud 68, which is supported in any convenient fashion, for example, a plurality of circumferentially positioned supporting straps 70 extending from primary duct 26. Each flap 52 carries a roller 72, which is guided on contoured track 74 which extends from support shroud 68. The axial reciprocation of support ring 56 by actuating cylinder-piston unit 58 will cause roller 72 to run along tract 74 and hence cause flaps 52 of variable area exhaust nozzle 48 to pivot between their maximum diameter position shown in FIG. 2 and their minimum diameter position shown in FIG. 3.

In the supersonic or FIG. 2 position, blow-in doors 44 and variable area secondary nozzle 46 are both in their outer pivotable position. While each is shown to be actuated in hydromechanical fashion, it should be borne in mind that in many installations it will be found that doors 44 and secondary nozzle 46 are capable of aerodynamic actuation due to the variations in pressure internally and externally thereof which exist for supersonic and subsonic flight conditions. Generally speaking, the pressures acting on the inner surfaces 80 and 82 thereof, respectively, are higher at supersonic than at lower speeds due to increased ram effect which raises the pressure in both the secondary passage 36 and in the afterburner 14. This pressure holds the doors 44 and flaps 102 in their outer position. At low flight mach numbers on the other hand, reduced internal pressure holds the doors and flaps in their inner position. FIG. 2 shows blow-in doors 44 to be in their pivotally outer position such that they join secondary duct 34 to fixed member 40.

With doors 44 and secondary nozzle 46 in their pivotally outer position (FIG. 2), it will be noted that outer surfaces 76 and 78 thereof, respectively, coact with outer surface 84 of fixed member 40 and outer surface 86 of secondary duct 34 to form a substantially cylindrical exterior surface which has relatively low external drag. FIG. 2 further shows that inner surface 82 of secondary nozzle 46 comprises a smooth divergent continuation of divergent portion 88 of the inner surface 90 of fixed member 40 and it will further be noted that divergent portion 88 of fixed member 40 joins upstream convergent portion 92 thereof at 94 to form a smooth continuous duct. With exhaust outlet 10 in its FIG. 2 supersonic position, engine exhaust gases will pass through primary gas passage 96, defined by duct 26, and through primary exhaust nozzle throat 98, defined by exhaust nozzle 48 to create primary jet 124 downstream thereof. Secondary air from passage 36 passes along the inner surface 80 of the blow-in doors 44 and over surface 92 of fixed member 40, filling up the region 126 between surfaces 44, 74, 92 and the primary jet 124. Secondary air then passes over surface 90 of fixed member 40 and the inner surface 82 of secondary nozzle 46 thereby providing a cooling layer of air thereagainst so that the heated exhaust gas from primary passage 96, after passing through primary nozzle throat 98 will expand to create primary jet 124 which coacts with the secondary air, and due to the presence of secondary air in the passage 126, will experience a smooth continuous expansion through divergent passage 100 from the throat 98 to the exit 130, thereby providing maximum thrust generation.

Figure 5:
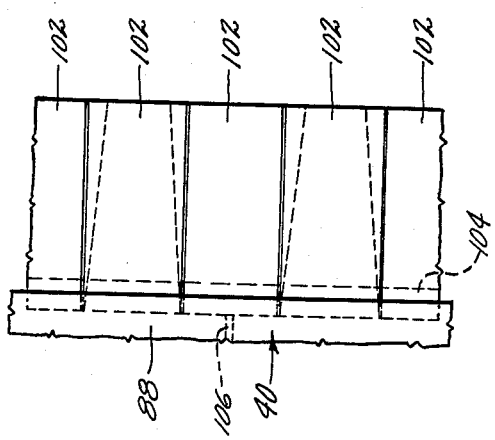
FIG. 5 is a view taken along line 5—5 of FIG. 3.
Figure 4:
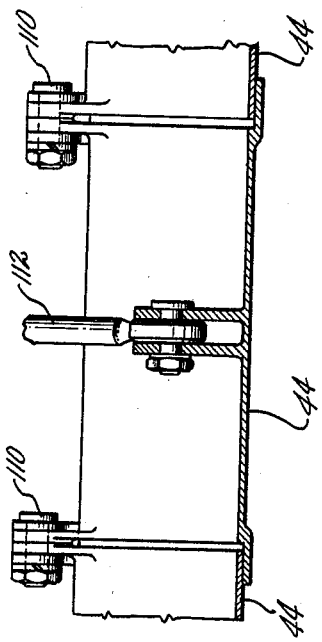
FIG. 4 is a view taken along line 4—4 of FIG. 2.

Secondary nozzle 46 comprises a plurality of sealably overlapping flaps 102 which overlap as best shown in FIG. 5 for gas sealing purposes and each of which is pivotally connected at pivot point 104 to the downstream end of fixed member 40. While secondary nozzle 46 may be aerodynamically actuated as previously described, in some installations it may be found necessary to physically actuate same and such might well be done hydromechanically by the actuation of crank-linkage 106 by piston-cylinder unit 108, each of which is supported as shown by fixed member 40. Blow-in doors 44 are pivotally attached to pivot point 110 to secondary duct 34 and are caused to pivot thereabout by linkage 112, which is supportably guided by roller units 114 and 116 on track 118 and caused to move axially by hydraulically actuated cylinder-piston unit 120.

Figure 3:
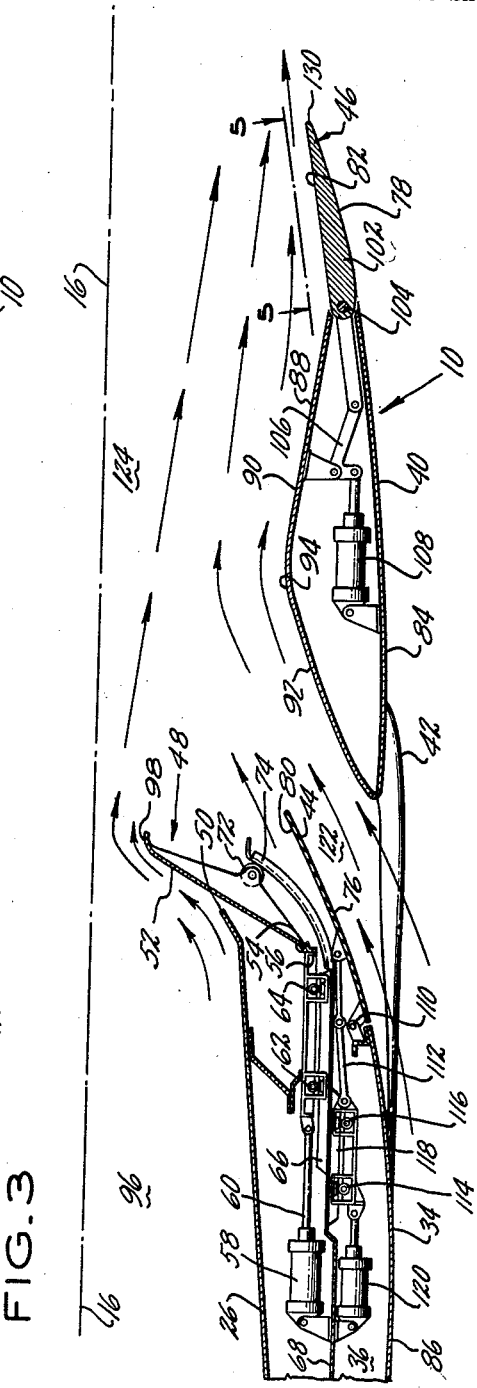
FIG. 3 is similar to FIG. 2 but shows my exhaust outlet in its subsonic position.

FIG. 3 shows exhaust outlet 10 in its subsonic position wherein primary exhaust nozzle flaps 52, doors 44 and secondary nozzle 46 are in their inner pivoted position with afterburner 14 inoperative. In this FIG. 3 subsonic position, exhaust nozzle 48 defines a primary exhaust outlet 98 minimum diameter, through which the exhaust gases from engine 12 pass after first passing through inoperative afterburner 14. With doors 44 in their inner FIG. 3 position, the outer surface 76 theerof coacts with the convergent surface 92 of fixed member 40 to define a tertiary air passage 122 which concentrically envelops secondary passage 36 and primary passage 96. Further, the outer surfaces 86 and 76 of secondary duct 34 and doors 44, respectively, coact to form a gently curved surface, preferably elliptically converging in a downstream direction, over which free stream air passes and enters into tertiary passage 122. The aforementioned gentle and preferably elliptical curvature prevents flow separation of the free stream air along surfaces 86 and 76 and thereby causes large quantities of air to enter the tertiary passage 122 and fill the annular area defined between the primary jet 124 and the shroud exit 130, thereby eliminating base drag and overexpansion losses. Other shapes such as involute with the large radius of curvature at the leading edge of surfaces 86 and 84 may also be used.

With secondary nozzle 46 in its pivoted inner position of FIG. 3, its inner surface 82 forms a convergent continuation of the divergent portion 88 of the inner surface 90 of fixed member 40 while its outer surface 78 coacts with outer surface 84 of fixed member 40 to define a continuous and smooth outer surface of gentle curvature, which is preferably elliptically converging in a downstream direction. This elliptical shape permits the favorable combination of low external drag, reasonably short flaps 102, and sufficiently reduced exit area 130 which is associated with good internal performance.

With exhaust outlet 10 in its FIG. 3 subsonic position, the engine exhaust gases which pass through primary exhaust outlet 98 are concentrically enveloped first by the cooling air passing through secondary passage 36 and then by the free stream air passing through tertiary passage 122 so that a column of air is formed which will be equal to the cross-sectional area of the exhaust outlet 130 formed by secondary nozzle 46.

To obtain best performance the blow-in-door flow area 122, provided for the tertiary air at its inlet as it passes between doors 44 and fixed surface 92, should be approximately equal to the annular flow area provided for the tertiary air at its outlet as it passes through the annular area defined between the expanded primary jet 124 and outlet 130 defined by the trailing edge of flaps 102 in their inner position. By providing the jet flow and tertiary flow with nearly constant flow passage areas, these streams are maintained at nearly constant velocities, so that losses in the duct are minimized, and at nearly constant pressure equal approximately to ambient pressure so that overexpansion and base drag losses are not encountered. For many installations this tertiary flow area may best be held constant by providing both blow-in doors and trailing edge flaps of comparatively short length, rather than blow-in doors alone or trailing edge flaps alone which singly would have to be much longer in order to meet the requirement of nearly constant flow passage area.

The requirement of constant tertiary flow area is not critical. Moderate changes may be made without severe losses in performance. It has also been found that the configuration or components of the configuration or the installation need not necessarily be axisymmetric as described above in order to obtain good performance. Good performance has also been obtained in a side-by-side type of engine installation. In the preferred embodiment the leading edge of the elliptically shaped shroud outer surfaces 86 and 84 should have large radii of curvature, preferably equal to at least five times the radius of the duct 34 as measured from the centerline 16.

The exhaust outlet and shroud length are sized to obtain the desired performance at supersonic flight speeds when the doors 44 and trailing edge flaps 102 are in their outer position. Normally, the outlet so chosen would be far too large for good performance at reduced flight speeds. This invention relates, therefore, to the improved performance which is obtainable at lower flight speeds by the use of properly designed blow-in doors and trailing edge flaps as described above and is not limited to any particular choice of exhaust outlet area or shroud length.

While a particular embodiment was selected herein to illustrate my invention, it will be obvious to those skilled in the art that various changes and modifications may be made without departing from the spirit thereof.

I claim:

1. An exhaust nozzle of circular cross section and concentric about an axis and adapted to discharge gases therethrough to atmosphere comprising a primary duct having a radius and defining a primary gas passage with a primary variable area exhaust nozzle at the downstream end thereof, means to actuate said nozzle between an outer position defining a maximum diameter sized for high speed operation and an inner position defining a minimum diameter sized for low speed operation, a secondary duct larger than said primary duct and having an outer surface with an axial radius of curvature larger than said primary duct radius, means to support said secondary duct to envelop said primary duct in radial spaced relation thereto to define a secondary gas passage therebetween and concentric about said primary gas passage, a fixed member, means supporting said fixed member in spaced relation to and axially downstream of said secondary duct, said fixed member having a smooth outer surface with an axial radius of curvature larger than said primary duct radius and an inner surface having a convergent upstream portion and a divergent downstream portion and which portions are smoothly joined, a variable area secondary nozzle operatively connected to the downstream end of said fixed member and having an outer and inner surface and being movable between an outer position wherein said secondary nozzle inner surface forms a smooth divergent continuation of said fixed member divergent portion so that said secondary nozzle forms an outlet having a first diameter sized for supersonic flight, and further while said secondary nozzle outer surface coacts with said fixed member outer surface to form a substantially cylindrical surface and an inner position wherein said secondary nozzle inner surface converges to form an outlet having a diameter smaller than said first diameter and said secondary nozzle outer surface coacts with said fixed member outer surface to form a smooth elliptical shape converging in a downstream direction, a plurality of doors operatively connected to the downstream end of said secondary duct to form a variable area continuation thereof, said doors having an outer surface and being movable between an outer position wherein said doors join said secondary duct and said fixed member upstream portion so that said outer surfaces of said secondary duct, said doors, said fixed member and said secondary nozzle coact to form a substantially cylindrical outer surface and an inner position wherein said door outer surface and said secondary duct outer surface coact to form a smooth elliptical shape converging in a downstream direction while said door outer surface and said fixed member convergent portion coact to form a tertiary gas passage of selected flow area and concentric with said primary and secondary passages, means to pass gas through said primary passage when said nozzle, doors, and secondary nozzle are in their inner position to create an expanding primary jet downstream of said nozzle which defines an annular area approximately equal to said tertiary gas passage area with said inner surfaces of said fixed member and said secondary nozzle, means to pass gas through said secondary and tertiary passages with said nozzle, doors and secondary nozzle so positioned to envelop said primary jet and fill said annular area since said gas from all of said passages coacts to form a solid column of gas having an area at least equal to the outlet formed by said secondary nozzle so positioned as said gas column passes through said outlet, and means to pass gas through said primary and secondary gas passages when said nozzles, doors, and secondary nozzle are in their outer position so that a layer of air from said secondary passage fills an annular region defined between said primary jet and said fixed member and secondary nozzle and flows along said diverging portion of said fixed member and said inner surface of said secondary nozzle so positioned while said gas from said primary passage coacts therewith to form a smoothly and continuously expanding stream of primary gas along said annular secondary air region and said fixed member diverging portion and said secondary nozzle inner surface so positioned.

2. An exhaust nozzle of circular cross section and concentric about an axis and adapted to discharge gases therethrough to atmosphere comprising a primary duct having a radius and defining a primary gas passage with a primary variable area exhaust nozzle at the downstream end thereof, means to actuate said nozzle between an outer position defining a maximum diameter sized for high speed operation and an inner position defining a minimum diameter sized for low speed operation, a secondary duct larger than said primary duct and having an outer surface with an axial radius of curvature approximately equal to five times said primary duct radius, means to support said secondary duct to envelop said primary duct in radial spaced relation thereto to define a secondary gas passage therebetween and concentric about said primary gas passage, a fixed member, means supporting said fixed member in spaced relation to and axially downstream of said secondary duct, said fixed member having a smooth outer surface with an axial radius of curvature approximately equal to five times said primary duct radius and an inner surface having a convergent upstream portion and a divergent downstream portion and which portions are smoothly joined, a variable area secondary nozzle operatively connected to the downstream end of said fixed member and having an outer and inner surface and being movable between an outer position wherein said secondary nozzle inner surface forms a smooth divergent continuation of said fixed member divergent portion so that said secondary nozzle forms an outlet having a first diameter sized for supersonic flight, and further while said secondary nozzle outer surface coacts with said fixed member outer surface to form a substantially cylindrical surface and an inner position wherein said secondary nozzle inner surface converges to form an outlet having a diameter smaller than said first diameter and said secondary nozzle outer surface coacts with said fixed member outer surface to form a smooth elliptical shape converging in a downstream direction, a plurality of doors operatively connected to the downstream end of said secondary duct to form a variable area continuation thereof, said doors having an outer surface and being movable between an outer position wherein said doors join said secondary duct and said fixed member upstream portion so that said outer surfaces of said secondary duct, said doors, said fixed member and said secondary nozzle coact to form a substantially cylindrical outer surface and an inner position wherein said door outer surface and said secondary duct outer surface coact to form a smooth elliptical shape converging in a downstream direction while said door outer surface and said fixed member convergent portion coact to form a tertiary gas passage of selected flow area and concentric with said primary and secondary passages, means to pass gas through said primary passage when said nozzle, doors and secondary nozzle are in their inner position to create an expanding primary jet downstream of said nozzle which defines an annular area approximately equal to said tertiary gas passage area with said inner surfaces of said fixed member and said secondary nozzle, means to pass gas through said secondary and tertiary passages with said nozzle, doors and secondary nozzle so positioned to envelop said primary jet and fill said annular area since said gas from all of said passages coacts to form a solid column of gas having an area at least equal to the outlet formed by said secondary nozzle so positioned as said gas column passes through said outlet, and means to pass gas through said primary and secondary gas passages when said nozzles, doors and secondary nozzle are in their outer position so that a layer of air from said secondary passage fills an annular region defined between said primary jet and said fixed member and secondary nozzle and flows along said diverging portion of said fixed member and said inner surface of said secondary nozzle so positioned while said gas from said primary passage coacts therewith to form a smoothly and continuously expanding stream of primary gas along said annular secondary air region and said fixed member diverging portion and said secondary nozzle inner surface so positioned.

References Cited in the file of this patent

UNITED STATES PATENTS

| 2,604,278 | Johnson | July 22, 1952 |
| 2,770,944 | Jordan | Nov. 20, 1956 |
| 2,846,844 | O'Rourke | Aug. 12, 1958 |
| 2,882,679 | Karcher | Apr. 21, 1959 |
| 2,885,162 | Griswold | May 5, 1959 |
| 2,910,829 | Meyer | Nov. 3, 1959 |
| 2,926,491 | Hyde | Mar. 1, 1960 |
| 2,969,641 | Schaefer | Jan. 31, 1961 |
| 2,986,002 | Ferri | May 30, 1961 |

OTHER REFERENCES

Grinyer, "Large Lightweight Turbojet Engines," SAE Transactions, vol. 66, copyright 1958, pages 318 and 319.

Pearson, "Exhaust Nozzles for Supersonic Aircraft," Journal of the Royal Aeronautical Society, vol. 62, No. 573, September 1958, pp. 658–662.